United States Patent [19]

Ono

[11] Patent Number: 4,842,824
[45] Date of Patent: Jun. 27, 1989

[54] OPTICAL STORAGE MEDIUM
[75] Inventor: Yuzo Ono, Tokyo, Japan
[73] Assignee: NEC Corporation, Japan
[21] Appl. No.: 111,493
[22] Filed: Oct. 22, 1987
[30] Foreign Application Priority Data Oct. 23, 1986 [JP] Japan .................................. 61-253033

[51] Int. Cl.[4] .............................................. B32B 3/02
[52] U.S. Cl. ........................................ 428/64; 428/65;
428/209; 428/412; 428/461; 428/463; 428/500;
428/522; 428/913; 428/156; 428/161; 428/164;
428/167; 369/275; 369/280; 369/288; 369/292;
430/945; 346/76 L; 346/135.1
[58] Field of Search .................... 428/64, 65, 209, 913,
428/412, 461, 463, 500, 522, 156, 161, 164, 167;
369/275, 280, 292, 288; 430/945; 346/76 L,
135.1

[56] References Cited
U.S. PATENT DOCUMENTS 4,576,850 3/1986 Martens ................................ 428/156
4,582,885 4/1986 Barber .................................. 428/447
4,668,558 5/1987 Barber .................................. 428/156

OTHER PUBLICATIONS

Wilson et al., "The Optical Properties of 'Moth Eye' Antireflection Surfaces", *Optica Acta*, vol. 29, No. 7, pp. 993–1009 (1982).
Craighead et al., "Textured Germanium Optical Storage Medium", *Appl. Phys. Lett.* 40(8), pp. 662–664 (Apr. 15, 1982).
Enger et al., "Optical Elements with Ultrahigh Spatial–Frequency Surface Corrugation", *Applied Optics*, vol. 22, No. 20, pp. 3220–3228 (Oct. 15, 1983).
Born, *Principles of Optics*, Chapter 14, Section 14.5.2, pp. 705–708 (2nd edition 1964).

Primary Examiner—Ellis P. Robinson
Assistant Examiner—P. J. Ryan
Attorney, Agent, or Firm—Leydig, Voit & Mayer

[57] ABSTRACT

An optical storage medium comprises a thermoplastic resin substrate having a concave and convex surface grating on one surface thereof, and a metal layer covering the concave and convex surface grating. The period of the concave and convex surface grating is less than a wavelength of light so that light reflected from the concave and convex surface grating is changed from linear polarization to elliptical polarization, while there is no change in the polarization of light reflected from a recording pit in which the concave and convex surface grating has collapsed. Therefore, information can be read out of the optical storage medium in accordance with the change of light polarization.

1 Claim, 3 Drawing Sheets

OPTICAL STORAGE MEDIUM

FIELD OF THE INVENTION

The invention relates to an optical storage medium, and more particularly to an optical storage medium in which information like image data are stored.

BACKGROUND OF THE INVENTIONS

One of antireflection surfaces which is applicable to an optical storage medium is described on pages 993 to 1009 of "Optica Acta, 1982, Vol. 29, No. 7". The antireflection surface is called "Moth Eye" and comprises a very fine array of protuberances thereon. Each of the protuberances is round in its plane, and the diameter thereof is approximately ⅓ μm as described later. In the antireflection surface, the reflection factor is as low as several percent, although the theory and manufacture thereof are not described here in detail.

There has been proposed an optical storage medium utilizing such an antireflection surface which comprises a plastic substrate on which a very fine array of protuberances are formed, and a metal layer covering the protuberances. The diameter of each of the protuberances is much smaller than that of a recording pit which will be described later.

In the optical storage medium, a laser beam is radiated in accordance with information stored in a memory such that the laser beam is passed through the plastic substrate to reach the metal layer. As a result, the metal layer absorbs the laser beam and is heated up to a predetermined temperature so that a portion of the plastic substrate which is in contact with the metal layer thus heated is softened. The softened plastic substrate becomes relatively flat due to the surface tension thereof which tends to decrease the surface area of the portion. As a result, a flat portion into which an image signal is written is formed as illustrated later.

In the optical storage medium into which information is written as described above, the reflection factor of the flat portion is increased from several percent to several tens of percent. Therefore, information stored therein can be read out thereof due to the difference in the reflection factors between the flat portion and non-flat portion of the protuberances.

There has been proposed another optical storage medium on pages 662 to 664 of "Applied Physics Letters, Vol. 40, No. 8" published on Apr. 15, 1982. The optical storage medium comprises a glass substrate, and a Ge layer deposited on the glass substrate. A random array of submicron columns are formed on the surface of the Ge layer by reactive ion etching. The formation of the submicron columns results in an optical antireflection surface due to the graded refractive index produced by the textured surface.

In writing image data into the optical storage medium, the submicron columns are melted in accordance with the information carried by a laser beam. As a result, reflective spots are formed locally due to the collapse of the columnar structure, although the details thereof are not described here.

In the both former and latter optical storage medium, however, there are the following disadvantages. The first disadvantage is that it is rather difficult to provide a very fine array of the protuberances called "Moth Eye" on the plastic substrate which are smaller in the diameter than a wavelength of light, and to provide a random array of the columns of crossectional dimensions less than 100 nm on the surface of a Ge layer. The second disadvantage is that S/N ratio of information which is read out of the optical storage medium is not as high as expected because the reading signal of the information is based on the difference between the intensities of light which are reflected from the surface including the protuberances and from the flat portions. In other words, light passing through the plastic substrate is changed in its intensity due to a stain, crack etc. on the back surface thereof even if incident light is maintained at a constant level. As a result, the S/N ratio mentioned above is decreased especially in an optical storage medium such as an optical card which is liable to receive such a stain or crack on the back surface thereof during a practical use thereby reducing its reliability.

SUMMARY OF THE INVENTION

Accordingly, it is an object of the invention to provide an optical storage medium which is more easily manufactured, for instance, by use of a nickel electrotypy.

It is another object of the invention to provide an optical storage medium in which S/N ratio is improved thereby increasing its reliability.

According to the invention, an optical storage medium comprises, a thermoplastic resin substrate having a concave and convex surface grating on one surface thereof, a period of said concave and convex surface grating being less than a wavelength of light, and a metal layer with which said concave and convex surface grating is coated.

BRIEF DESCRIPTION OF THE DRAWINGS

The invention will be explained in more detail in accordance with following drawings wherein.

DESCRIPTION OF THE PREFERRED EMBODIMENT

Before describing an optical storage medium in an embodiment according to the invention, a conventional optical storage medium utilizing an antireflection surface called "Moth Eye" as described before will be explained in conjunction with FIGS. 1A to 1C.

Figure 1A:
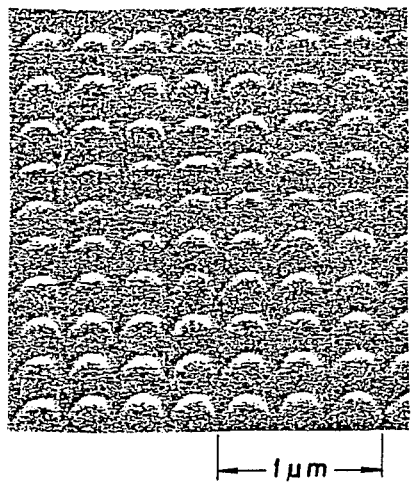
FIG. 1A is an explanatory view illustrating a conventional optical antireflection surface.

FIG. 1A shows the antireflection surface which comprises a very fine array of protuberances 1.

Figure 1B:
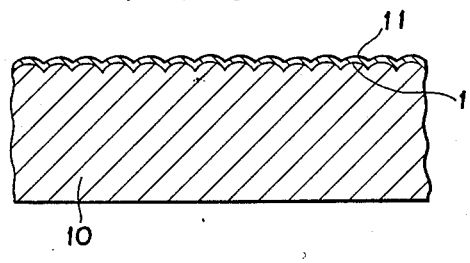
FIGS. 1B and 1C are cross sectional views illustrating a conventional optical storage medium which utilizes the optical antireflection surface in FIG. 1A.

FIG. 1B shows a cross section of a conventional optical storage medium to which the antireflection surface shown in FIG. 1A is applied. The conventional optical storage medium comprises a plastic substrate 10 having a very fine array of the protuberances 1 thereon, and a metal layer 11 provided on the protuberances 1.

Figure 1C:
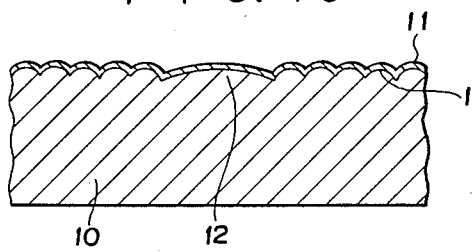

FIG. 1C shows the optical storage medium shown in FIG. 1B in which a recording pit 12 is provided to store an image signal.

In the optical storage medium shown in FIG. 1B, a laser beam radiated in accordance with information from a laser light source (not shown) is passed through the plastic substrate 10 to reach the metal layer 11. As a result, the metal layer 11 absorbs the laser beam and is heated up to a melting temperature of the plastic substrate 10. The plastic substrate 10 is softened locally and becomes relatively flat thereby providing the recording pit 12 in the optical storage medium shown in FIG. 1C for the reason described before.

In the optical storage medium in FIG. 1C, the reflection factor is increased at the recording pit 12 up to several tens of percent as compared to a reflection factor of several percent at areas other than the recording pit 12. Therefore, information can be read out of the optical storage medium due to the difference between the intensities of light which are reflected on the optical storage medium.

Figure 2:
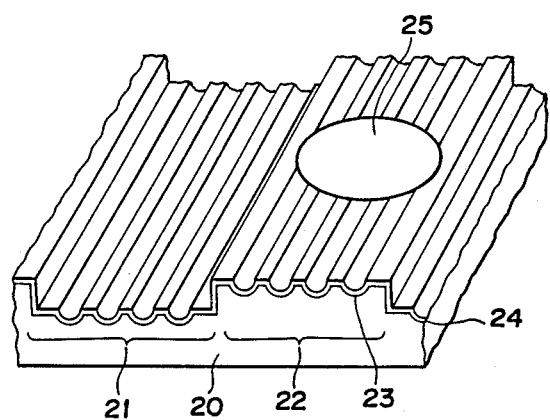
FIG. 2 is a perspective view illustrating an optical storage medium in a first embodiment according to the invention.

In FIG. 2, there is shown an optical storage medium in a first embodiment according to the invention. The optical storage medium comprises a thermoplastic resin substrate 20 on which tracking grooves 21 and recording lands 22 are provided. A concave and convex surface grating 23 is provided on the thermoplastic resin substrate 20, and a thin metal layer 24 covers the concave and convex surface grating 23. Recording pits 25 are formed on the recording lands 22 to eliminate the concave and convex surface grating 23 locally. The concave and convex surface grating 23 includes a plurality of grating grooves which are parallel to each other and have a period of 0.3 μm, less than a wavelength of light. The thermoplastic resin substrate 10 is of a material which is selected from such resins as polycarbonate, acrylic, vinyl chloride, polystyrene etc. and is formed with the concave and convex surface grating 23 thereon by an injection molding method. Further, the metal layer 24 is of a material which is selected from such metals as gold, platinum, aluminum, chromium etc. and is deposited on the concave and convex surface grating 23 in a thickness of approximately 1000Å by evaporation, sputtering, or ion-plating method.

Figure 3:
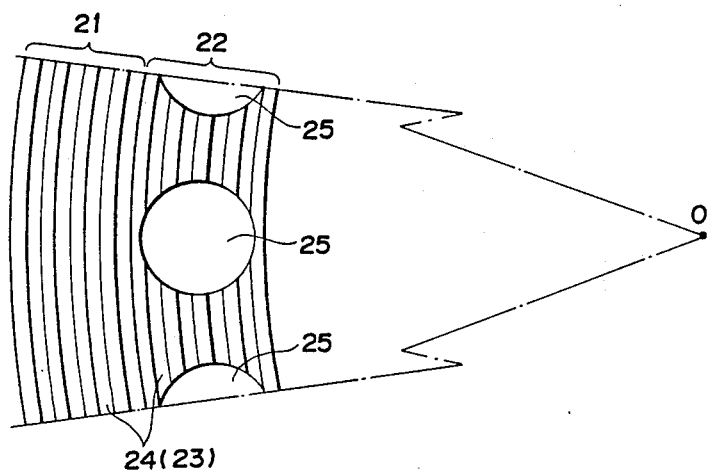
FIG. 3 is a plan view illustrating an optical storage medium in a second embodiment according to the invention.

In FIG. 3, there is shown an optical storage medium in a second embodiment according to the invention. The optical storage medium is a disc. A plurality of grating grooves of a concave and convex surface grating 23 are provided on a tracking groove 21 and recording land 22, which are concentric in regard to the center point 0 of a disc. Therefore, recording pits 25 are also arranged in the same manner. The concave and convex surface grating 23 is covered with a thin metal layer 24.

Figure 4:
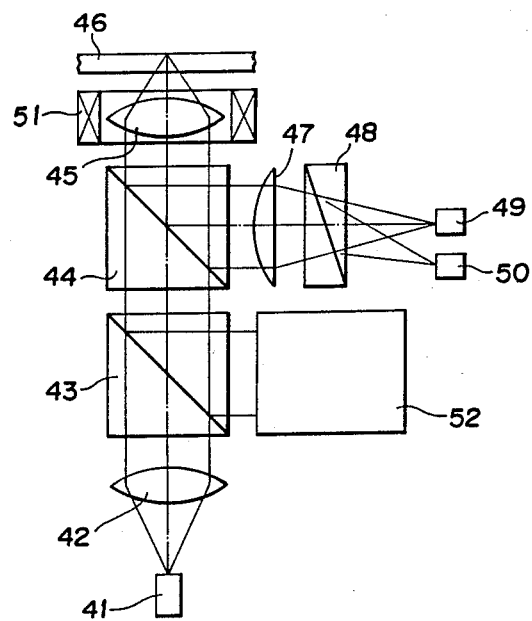
FIG. 4 is an explanatory view showing a system for writing and reading information to and from the optical storage medium in the first and second embodiments according to the invention.

In FIG. 4, there is shown an optical head system for writing information into an optical storage medium according to the invention and reading the information out thereof. The optical head system comprises a laser diode 41 for radiating a linearly polarized beam, a collimator lens 42 for collimating the linearly polarized beam, beam splitters 43 and 44 which are positioned on a laser beam path, an object lens 45 for focussing the laser beam on the optical storage medium 46, a focussing lens 47 for focussing the laser beam reflected by the beam splitter 44 (which is a part of the reflected laser beam), an analyzer 48 that is a Rochon prism for separating the reflected laser beam, first and second photodetectors 49 and 50 for detecting the separated laser beams, and an error signal detecting system 52 for detecting error signals in accordance with the laser beam reflected by the beam splitter 43 (which is a part of the reflected laser beam) to control an actuator 51 to correct tracking and focussing errors of the object lens 45.

In operation, when the laser diode 41 is driven to radiate the linearly polarized laser beam which is modulated by information, the linearly polarized laser beam is passed through the beam splitters 43 and 44 after being collimated by the collimator lens 42, and then focussed through the thermoplastic resin substrate 20 of the optical storage medium 46 on the back surface of the metal layer 24 thereof by the object lens 45. As a result, the metal layer 24 absorbs the laser beam and is heated up to the melting temperature of the substrate 20 so that the concave and convex surface grating 23 collapses locally to produce a recording pit 25.

Next, operation of reading the information out of the optical storage medium 46 which is performed according to the two following principles will be explained.

(1) Difference of the reflection factors between the recording pit and concave and convex surface grating.

Even in a concave and convex surface grating 23 consisting of a plurality of grating grooves, a period of which is smaller than a wavelength of light, it is known that the effect of preventing light from being reflected is expected, for instance, as described on pages 3220 to 3228 of "Applied Optics, Vol. 22, No. 20" published on Oct. 15, 1983. Therefore, information can be read out of an optical storage medium according to the invention based on the difference of the reflection factors of a recording pit 25 and the concave and convex surface grating 23 as performed in a conventional storage medium.

In operation, when the laser beam is radiated from the laser diode 41 and passed through the beam splitter 43 after being collimated by the collimator lens 42, the laser beam is reflected by the optical storage medium 46 after being focussed by the object lens 46. The laser beam thus reflected is partly reflected by the beam splitter 43 and received at the error signal detecting signal 52. The error signal detecting system 52 includes a well known photodetector with four divided photodetector elements. The elements contact each other so that information can be read out of the optical storage medium 46 based on the addition of the intensities of the light beams which are received at two of the four photodetector elements that are opposite each other. The light beam reflected on the recording pit 25 is greater in intensity than the light beam reflected on the concave and convex surface grating 23. The present method can be applied to an optical disc as contained in a cartridge which is not liable to receive a stain or crack thereon. As cleary understood from the above, the beam splitter 44, focussing lens 47, analyzer 48, and photodetector 49 and 50 are unnecessary as far as the above mentioned operation is performed.

(2) Change in the polarization of the reflected light based on the birefringence produced at the concave and convex surface grating.

The birefringence is known to be produced in a transmitting type a high density grating as described on pages 705 to 708 of "Principle of Optics, Chapter 14, Section 14.5.2."by M. Born. Birefringence is observed even in a reflecting type of a high density grating.

Figure 5:
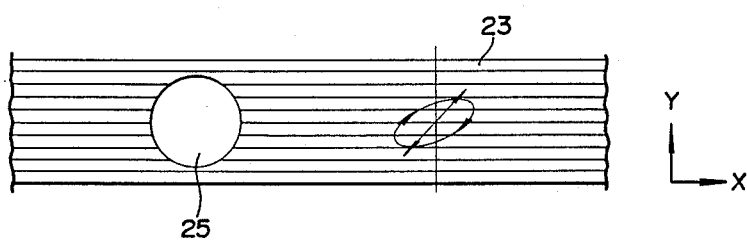
FIG. 5 is light explanatory view showing an incident on and reflected from the optical storage medium in the first and second embodiments according to the invention.

As shown in FIG. 2, the concave and convex surface grating 23 is eliminated partly at the recording pit 25 where an image signal is written. Therefore, birefringence does not occurred therein because there is no change in the polarization of light which is reflected from the recording pit 25. This will be explained in conjunction with FIG. 5 wherein the concave and convex surface grating 23 is provided on the thermoplastic resin substrate such that each of the grating grooves are parallel to the X axis and orthogonal to the Y axis. In FIG. 5, when a linearly polarized laser beam is reflected on the recording pit 25 of the optical storage medium, the polarization of the reflected laser beam remains unchanged. On the other hand, the laser beam which is reflected from the concave and convex surface grating 23 is changed from linear to elliptical polarization.

In operation, when a linearly polarized laser beam is radiated from the laser diode 41, the laser beam is passed through the beam splitters 43 and 44 after being collimated by the collimator lens 42, and reaches the optical storage medium 46 after being focussed by the object lens 45 whereby the laser beam is reflected with linear polarization from the recording pit 25 and with elliptical polarization from the concave and convex surface grating 23. The laser beam thus reflected is defocussed by the object lens 45, and is partly reflected by the beam splitter 44. The partly reflected laser beam is separated into the first and second reflected light beams by the analyzer 48 after being focussed by the focussing lens 47. The first and second reflected lights are respectively received by the first and second photodetectors 49 and 50 which are connected to a differential amplifier (not shown). In the differential amplifier, X and Y components $I_X$ and $I_Y$ of the polarized light beams are detected separately as follows.

$$I_X = 1 + \cos(\Delta\phi)$$

$$I_y = 1 - \cos(\Delta\phi)$$

where $\Delta\phi$ is a phase difference in the birefringence, and is calculated in the following equation.

$$\Delta\phi = \frac{2\pi d}{\lambda}(n_X - n_Y)$$

where $\lambda$ is a wavelength, d is a depth, and $n_X$ and $n_Y$ are effective refractive indexes in the directions of X and Y.

The differential output Iout is calculated in the following eqution.

$$I_{out} = I_X - I_Y$$

Accordingly, the differential output Iout based on the reflected light from the recording pit 25 is, $$I_{out} = 0$$

because the phase difference $\Delta\phi$ is "0" at the recording pit 25, and the differential output Iout based on the reflected light from the concave and convex surface grating 23 is, $$I_{out} = 2\cos(\Delta\phi)$$

because the phase difference $\Delta\phi$ is not "0".

As clearly understood from the above, the electrical signals produced by the light beams are processed differentially so that a change in light intensity resulting from a stain on or crack in the optical storage medium 46 is offset i.e., cancelled. Only a change in light intensity based on the presence of the recording pit 25 is detected it produces a change of light polarization.

On the other hand, the light reflected by the beam splitter 43 is received in the error signal detecting system 52. Signals for correcting a tracking or focussing error are supplied by error signal detecting system 52 to the actuator 51 so that the object lens 45 is moved to a predetermined position thereby correcting tracking or focussing error.

In the manufacture of an optical storage medium according to the invention, a high density concave and convex surface grating is formed in a process in which an interference pattern of two laser beam light fluxes is recorded on a photo-resist layer. This technique is very easy as compared to a process for forming very fine array of protuberances for a conventional optical storage medium. That is to say, a metal mold can be manufactured for the concave and convex surface grating provided on the photoresist layer by a nickel electrotypy method. A thermoplastic resin substrate on which the concave and convex surface grating is formed is easily produced by an injection molding process, or 2p method (optical resin hardening method) by use of the metal mold in the same manner that an optical disc is normally manufactured, thereby decreasing the manufacturing cost. In making ROM (Read Only Memory), a metal mold can be manufactured by a nickel electrotypy method to form a concave and convex pattern on which a metal layer is disposed as an optical storage medium into which information has been already written, so that a mass-production thereof is possible. The interchangeability of systems is improved in the invention because an optical head for writing information into an optical storage medium and reading the information out thereof can be replaced by one for an optical-magnetic disc. That is to say, the same disc driving system can be applied to a rewritable optical-magnetic disc and additionally to a writable type of an optical storage medium according to the invention.

Although the invention has been described with respect to specific embodiments for complete and clear disclosure, the appended claims are not thus limited, but are to be construed as embodying all modifications and alternative constructions that may occur to one skilled in the art which fairly fall within the basic teaching herein set forth.

What is claimed is:

1. An optical information storage medium from which recorded information may be read out by reflecting monochromatic light from the medium comprising:
    a thermoplastic resin substrate having a periodic concave and convex surface grating on one surface thereof, the period of said concave and convex surface grating being less than the wavelength of the light reflected from the medium to read out stored information and said thermoplastic resin being selected from the group consisting of polycarbonate, acrylic, vinyl chloride, and polystyrene; and
    a metal layer selected from the group consisting of gold, platinum, aluminum, and chromium coating said concave and convex surface grating.

* * * * *